Dec. 24, 1957 W. A. BARNES ET AL 2,817,254
COMPRESSION DEVICE OPERATED BY DIRECT AND REACTION FORCES
Filed Jan. 13, 1955 2 Sheets-Sheet 1
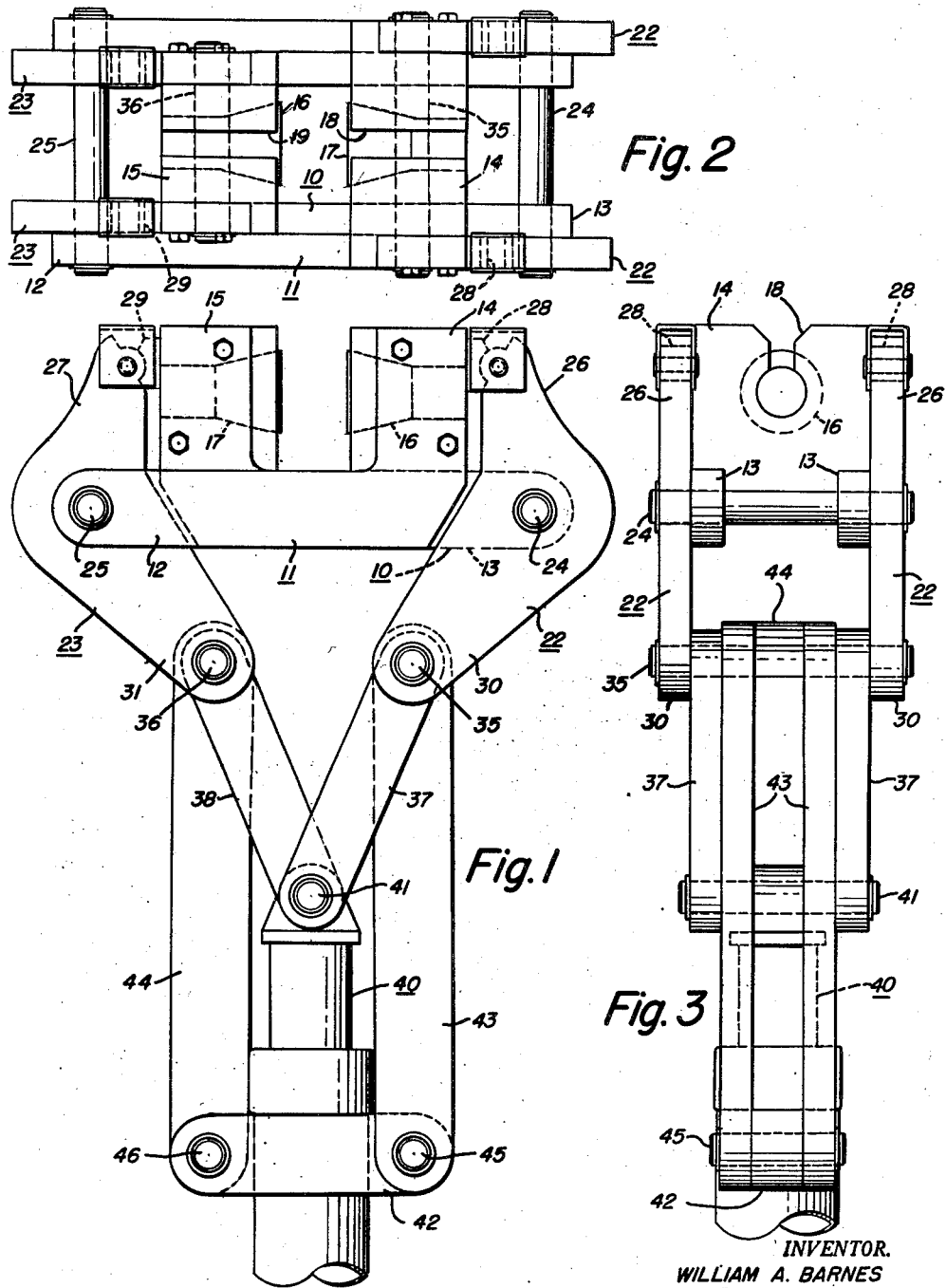
INVENTOR.
WILLIAM A. BARNES
WALTER J. ROZMUS
BY Ray S Pyle
atty United States Patent Office 2,817,254
Patented Dec. 24, 1957

2,817,254

COMPRESSION DEVICE OPERATED BY DIRECT AND REACTION FORCES

William A. Barnes, Utica, and Walter J. Rozmus, Whitesboro, N. Y., assignors to Utica Drop Forge & Tool Corporation, a corporation of New York Application January 13, 1955, Serial No. 481,647

7 Claims. (Cl. 78—82)

This invention relates in general to mechanical equipment for driving work performing members together in performing work operations, and relates more specifically to a compression device operated by direct and reaction forces for eliminating yield under stress and for producing an increasing force related to the increasing power requirements of the work being performed.

The union of metal under high pressure and confined flow at a temperature less than the normal welding temperature of such metal is now an accomplished fact in a commercial sense. The process generally has been set forth by Soweter in such patents as United States Patent No. 2,522,408 and Great Britain Patent No. 689,927. Specific tools and tooling have been developed, and certain basic principles discovered, by the present inventors and their associates.

The production of good welds by such tooling and methods is benefitted by producing compression forces that closely parallel the power requirements. The power requirements increase on a rapidly increasing scale as the weld approaches completion, as illustrated on the graph of the drawings. To produce full power throughout the weld is wasteful of power and machine capacity. To produce less than the required power is fatal to good weld results.

Therefore, an object of this invention is to produce a machine capable of driving work producing members relatively together with a predeterminable power curve relationship with respect to a power requirements curve.

Another object of the invention is to provide a mechanical movement to drive the work producing members, which mechanical movement has a plurality of power ratio couplings acting jointly to produce a predeterminable compound output of forces matched to the increasing power requirements of the work.

Other objects and a fuller understanding of the invention may be had by referring to the following description and claims, taken in conjunction wtih the accompanying drawings, in which:

Figure 1 is a side elevational view of a hydraulically powered tool embodying the principles of this invention as particularly adapted to the butt welding of longitudinal workpieces, the tool being in the open position as at the beginning of a work cycle;

Figure 2 is a top view of the tool;

Figure 3 is a side view of the tool;

Figure 4:
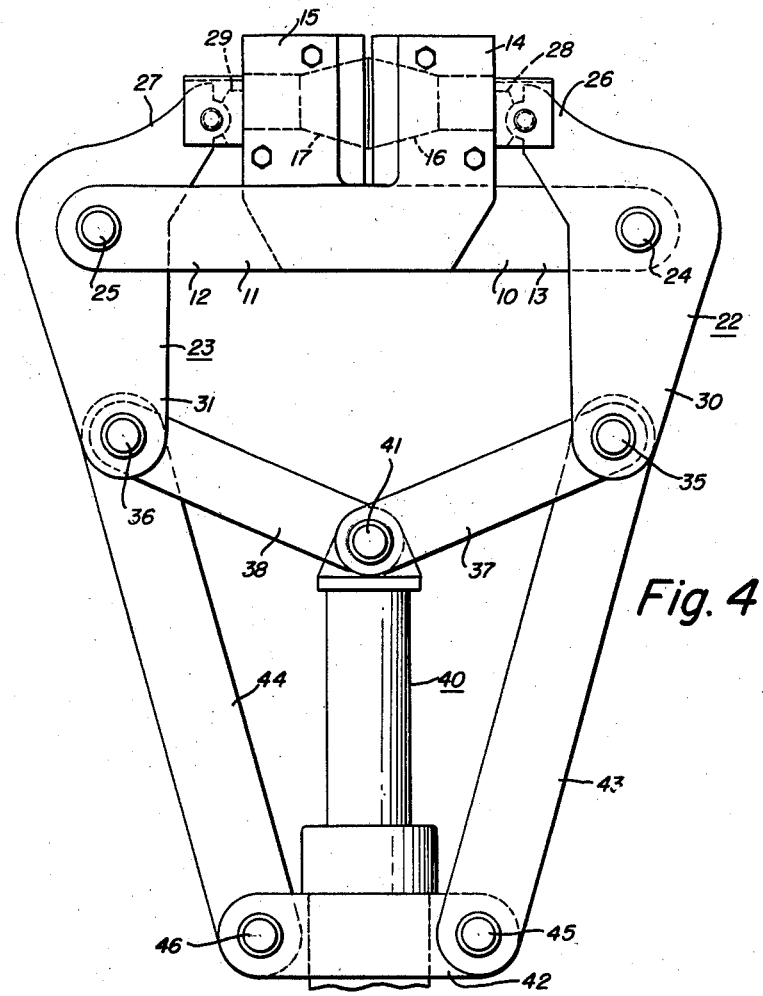
Figure 4 is a side view as in Figure 1, but in the closed position as at the end of a work stroke; and, Figure 5 is a graph charting the relationship of power requirement and power produced by the tool.

The drawings illustrate a hydraulic-mechanical apparatus carrying out the principles of this invention. The hydraulic mechanism provides the prime moving force and the mechanical mechanism provides a compound movement which produces a predeterminable power and speed ratio which will provide a closing force curve closely paralleling a force requirement curve for work being performed. The compound mechanical movement structure may be provided to produce any exact force curve as required for particular work.

The illustrated machine employs L-shaped work carriages 10 and 11. Work carriage 10 has a draw bar portion 13 and work carriage 11 has a draw bar portion 12. A tool portion 15 extends upwardly from the draw bar 13 and tool portion 14 from the draw bar 12. The work carriages 10 and 11 are in an overlapped position and therefore as the draw bars are moved apart along their common overlapping path the tool portions 14 and 15 will be drawn together.

The work carriages 10 and 11 may be cast as one intrical piece if desired, but preferably are made of weldment construction for strength and ease of fabrication. The tool portions 14 and 15 are designated as such because they may be the actual work performing members, or as illustrated in the drawings they may carry work dies such as the illustrated tapered split dies 16 and 17 used for cold welding of workpieces in a butt weld by the application of extreme pressures with a confined flow and at temperatures less than the normal welding temperature of such material. Cold welding of material requires considerable pressure particularly during the final stages of the weld, although a considerable movement of the welding dies is required prior to the final movement. The construction of this invention is therefore particularly adapted for this cold weld operation because the dies can be closed rapidly during the initial work period but will gradually slow in their closing movement and increase in pressure with a very definite speed to power ratio in relationship to the power requirements for producing the cold weld.

Reference to the Figure 2 of the drawings will reveal the open slotted top construction of the tool portions 14 and 15. The slotted tops are indicated by the reference characters 18 and 19. In the butt welding of long workpieces it is quite simple to insert the original workpieces from the back of the dies 16 and 17, but the removal of workpieces through the dies would be quite troublesome. Accordingly, the slots 18 and 19 provide vertical access out of the split dies after the formation of the weld, and also provide more convenient original placing of the workpieces prior to the weld.

The tool portions 14 and 15 with the dies 16 and 17 therein are driven through a work cycle along a rectilinear path. Such rectilinear movement is preferable in the production of cold welded butt welds. In order to assure uniform movement and to prevent yield of the tool portions, the tool portions are both pulled by their draw bar portions and pushed by associate apparatus bearing close behind the portion of greatest reaction force. In any apparatus requiring controllable force loads, yield of the driving members is a serious problem. Yield is controlled in the present apparatus by the provision of pivotable levers 22 and 23 which pull one draw bar and push the tool portion of the opposite carriage. Thus lever 22 is pivotally carried on the draw bar portion 13 by means of a pivot 24. Drive end 26 on lever 22 is provided with a pressure foot 28 having a slidable pressure contact with the back wall of the tool portion 14. Pivotal movement of lever 22 about the pivot 24 will therefore cause a longitudinal movement of the work carriage 10 in the direction of the pivot 24, and will apply a force to the back wall of tool portion 14 pressing that tool portion 14 in the opposite direction. Accordingly, even if the work carriage 11 were permanently located the one lever 22 would produce a uniform closing movement with the yield closely limited.

However, in this preferred embodiment the lever 23 is pivotally connected to the draw bar portion 12 of work carriage 11, and is provided with a drive end 27 and pressure foot 29 to bear against the back wall of tool portion 15. Accordingly, simultaneous drive of the levers 22 and 23 around their corresponding pivots 24 and 25 will provide a uniform closing movement of the tool portions 14 and 15 by draw and pressure.

Lever 22 extends to a driven end 30 and lever 23 to a driven end 31. Driving power can therefore be applied to the ends 30 and 31. In the illustrated embodiment of the invention this driving power is provided by a power ram 40 operating through links 37 and 38. The power links 37 and 38 are pivotally carried by the ram 40 by means of a pivot 41 and are joined to the driven ends 30 and 31 by means of pivots 35 and 36. The driving force is further controlled and perfected by the provision of control links 43 and 44 pivotally joined to a slidable collar 42 by means of pivots 45 and 46. Collar 42 is journalled to slide upon the power ram 40. Links 43 and 44 join the driven ends 30 and 31 at the pivots 35 and 36 along with the links 37 and 38.

Figures 1 through 3 illustrate the open position of the tool and the structural details of this illustrated embodiment of the invention. Workpieces may be loaded into the dies through the slots 18 and 19. The workpieces may be prepared for welding and aligned with respect to the dies by any suitable means. Such apparatus for preparing and aligning workpieces is not illustrated and forms no portion of the present invention.

The Figure 4 illustrates the closed position of the dies under drive actuation of the ram 40. It may be seen from this illustration that the pressure feet 28 and 29 have followed the surface of the tool portions 14 and 15 to apply a uniform pressure to these two portions simultaneously with the drawing of the tool portions by means of the draw bar portions 12 and 13.

Figure 5:
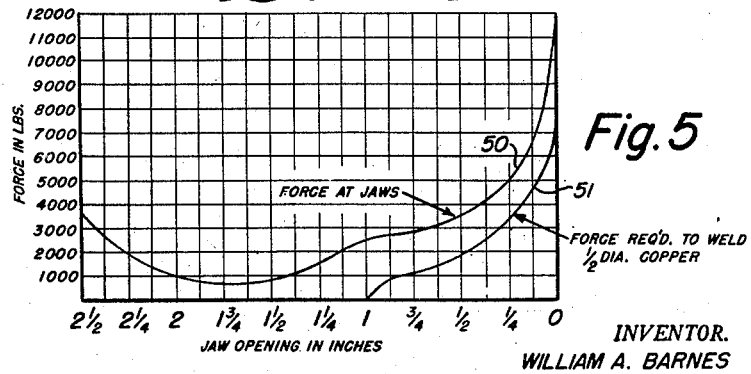

Figure 5 illustrates the close relationship of the force at the face of the dies as compared with the force required to weld a one-half inch diameter copper wire. The force at the dies is represented by the line 50 on the chart, whereas the force required is illustrated by the line 51. This graph also illustrates very forcibly one of the outstanding advantages of the present invention, namely the ability to design a machine which is only as strong as necessary and yet provides all of the necessary force requirements. A machine built to withstand any possible pressure and force requirements by reason of physical size rather than the improved pressure foot following construction of the present invention would of necessity be quite massive. The present invention avoids the necessity of having to build a machine capable of withstanding any possible force by its own physical mass and permits unyielding performance by the combination of draw and push forces as described.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An improved machine for driving work members together along a rectilinear path, comprising, first and second die means, a first draw bar drive means extending from said first die means in the direction of closing movement thereof, a second draw bar drive means extending from said second die means in the direction of closing movement thereof, a first lever member having a drive end and a driven end, said first lever member being pivotally carried by said first draw bar at a location beyond said second die means, a second lever member having a drive end and a driven end, said second lever member being pivotally carried by said second draw bar at a location beyond said first die means, said drive end of said first lever member in push-drive engagement with said second die means, said drive end of said second lever member in push-drive engagement with said first die means, and prime drive means to drive said driven ends of said first and second levers apart, whereby each of said first and second levers acts about a moving fulcrum and upon a moving resistance, both of which progressively decrease in speed as the lever angles produce and increase in leverage power ratio, and wherein each lever pulls one die means and pushes the other die means in the same closing movement.

2. In a work producing device having first and second work members relatively closable along a common path, the provision of improved drive means to close said work members, comprising, a pivoted lever, a draw bar from the pivot of said lever to said first work member, said pivoted lever having a drive end and a driven end, said drive end contacting said second work member, whereby pivoted drive forces applied to said lever will simultaneously pull said first work member and push said second work member in a closing movement of decreasing speed and increasing power ratio as the closing movement progresses.

3. In a work producing device having first and second work members relatively closable along a common path, the provision of improved drive means to close said work members, comprising, a first pivoted lever, a first draw bar from the pivot of said first lever to said first work member, said first pivoted lever having a drive end and a driven end, said drive end contacting said second work member, a second pivoted lever, a second draw bar from the pivot of said second pivoted lever to said second work member, said second pivoted lever having a drive end and a driven end, said drive end contacting said first work member, and power means acting to drive the driven ends of said first and second levers apart and thereby simultaneously pull said first and second work members together by the reaction forces of said first and second levers pivoting about said draw bars while the lever members are in pushing contact with the second and first work members respectively.

4. In a work producing device having first and second work members relatively closable along a common path, the provision of improved drive means to close said work members, comprising, a first pivoted lever, a first draw bar from the pivot of said first lever to said first work member, said first pivoted lever having a drive end and a driven end, said drive end contacting said second work member, a second pivoted lever, a second draw bar from the pivot of said second pivoted lever to said second work member, said second pivoted lever having a drive end and a driven end, said drive end contacting said first work member, and power means acting to drive the driven ends of said first and second levers apart and thereby simultaneously pull said first and second work members together by the reaction forces of said first and second levers pivoting about said draw bars while the lever members are in pushing contact with the second and first work members respectively, said power means comprising a power ram acting in a direction transverse to the direction of movement of said driven ends of said levers, first and second power links interconnecting said driven ends and said power ram, a collar journalled on said power ram, and first and second control links interconnecting said collar and said driven ends of said levers, said power links and control links pivotally joined to said driven ends in common pivotal union.

5. An improved machine for driving work members together along a rectilinear path, comprising, a first and second work carriage, each having a generally L shape with a draw bar portion and an upwardly extending tool portion, said draw bar portions overlapped in a common path of rectilinear movement with the tool portions positioned to close together by separation movement of the draw bar portions along said rectilinear path, a first lever member having a drive end and a driven end, pivot means intermediate said drive end and driven end interconnecting said first lever member to said draw bar at the end thereof opposite the tool portion, a second lever member having a drive end and a driven end, pivot means intermediate said drive end and driven end interconnecting said second lever member to said draw bar at the end thereof opposite the tool portion, said drive end of each lever having a contact block pivotally carried thereby and in sliding contact with the tool portion of the opposed work carriage, a power ram acting in a direction transverse to the said path of rectilinear movement, first and second power links interconnecting said driven ends of the levers to said power ram, a collar journalled on said power ram, and first and second control links interconnecting said collar and said driven ends of said levers, said power links and control links pivotally joined to said driven ends in common pivotal union.

6. An improved machine for driving work members together along a rectilinear path, comprising, first and second die means, a first draw bar drive means extending from said first die means in the direction of closing movement thereof, a second draw bar drive means extending from said second die means in the direction of closing movement thereof, a first lever member having a drive end and a driven end, said first lever member being pivotally carried by said first draw bar at a location beyond said second die means, a second lever member having a drive end and a driven end, said second lever member being pivotally carried by said second draw bar at a location beyond said first die means, said drive end of said first lever having a contact block pivotally carried thereby and in sliding contact with said second die means, said drive end of said second lever member having a contact block pivotally carried thereby and in sliding contact with said first die means, a power ram acting in a direction transverse to the said rectilinear path of the first and second die means, first and second power links interconnecting said driven ends of the levers and to said power ram, a collar journalled on said power ram, and first and second control links interconnecting said collar and said driven ends of said levers, said power links and control links pivotally joined to said driven ends in common pivotal union.

7. An improved machine having first and second work members relatively closable along a rectilinear path, a pivoted mechanical linkage drive means having a shifting pivot location and a shifting position of power application to produce a predetermined compound output of forces which provide an increasing power output matched to power requirements and wherein the said position of power application moves toward an alignment position with resultant work reaction forces, said pivoted mechanical linkage drive means comprising interlocked first and second draw bar drive members extending in opposed directions from said first and second work members respectively, first and second depending drive levers pivotally connected to said first and second draw bar drive members respectively, said first depending drive lever extending into contact with the reverse side of the second work member and said second depending drive lever extending into contact with the reverse side of the first work member, said first and second drive levers depending to a drive area, and power means driving said depending levers apart in said drive area.

References Cited in the file of this patent
UNITED STATES PATENTS
1,998,509   Keith _____ Apr. 23, 1953